United States Patent
Brookbanks et al.

(10) Patent No.: US 9,129,052 B2
(45) Date of Patent: Sep. 8, 2015

(54) METERING RESOURCE USAGE IN A CLOUD COMPUTING ENVIRONMENT

(75) Inventors: Michael D. Brookbanks, Nyetimber (GB); Brendan F. Coffey, Rhinebeck, NY (US); Christopher J. Dawson, Arlington, VA (US); Thirumal Nellutla, Schaumburg, IL (US); Robert C. Patterson, Jr., Sewickley, PA (US)

(73) Assignee: International Business Machines Corporation, Armonk, NY (US)

( * ) Notice: Subject to any disclaimer, the term of this patent is extended or adjusted under 35 U.S.C. 154(b) by 546 days.

(21) Appl. No.: 12/630,238

(22) Filed: Dec. 3, 2009

(65) Prior Publication Data

US 2011/0138034 A1 Jun. 9, 2011

(51) Int. Cl.
G06F 15/173 (2006.01)
G06F 11/34 (2006.01)
H04L 29/08 (2006.01)
H04L 12/24 (2006.01)

(52) U.S. Cl.
CPC ........ *G06F 11/3419* (2013.01); *H04L 41/5009* (2013.01); *H04L 41/5096* (2013.01); *H04L 67/1097* (2013.01); *H04L 67/125* (2013.01); *H04L 67/22* (2013.01); *G06F 2201/865* (2013.01); *G06F 2201/87* (2013.01)

(58) Field of Classification Search
CPC .......... G06F 11/3419; G06F 2201/865; G06F 2201/87; H04L 67/22; H04L 67/1097; H04L 67/125; H04L 41/5009; H04L 41/5096
USPC ........................................................ 709/224
See application file for complete search history.

(56) References Cited

U.S. PATENT DOCUMENTS

| 7,117,116 | B2 | 10/2006 | Chang et al. | |
|---|---|---|---|---|
| 7,574,496 | B2 | 8/2009 | McCrory et al. | |
| 7,596,625 | B2 | 9/2009 | Manion et al. | |
| 7,620,037 | B1* | 11/2009 | Bhaskaran et al. | 370/356 |
| 2003/0097438 | A1* | 5/2003 | Bearden et al. | 709/224 |
| 2009/0063105 | A1 | 3/2009 | Chang et al. | |
| 2009/0248693 | A1 | 10/2009 | Sagar et al. | |
| 2009/0265473 | A1* | 10/2009 | Hydrie et al. | 709/229 |
| 2009/0300608 | A1* | 12/2009 | Ferris et al. | 718/1 |
| 2010/0057683 | A1* | 3/2010 | Fein et al. | 707/3 |
| 2010/0214976 | A1* | 8/2010 | Libes et al. | 370/328 |
| 2011/0055378 | A1* | 3/2011 | Ferris et al. | 709/224 |

(Continued)

OTHER PUBLICATIONS

Mell, et al., "The NIST Definition of Cloud Computing", National Institute of Standards and Technology, Information Technology Laboratory, Version 15, Oct. 7, 2009, 2 pages.
Maitland, J., "Keeping Control Isn't Easy", Chapter 4: Cloud-Based Infrastructure, SearchCloudComputing.com, 13 pages.

(Continued)

*Primary Examiner* — Jonathan Bui
(74) *Attorney, Agent, or Firm* — William E. Schiesser; Keohane & D'Alessandro PLLC; Hunter E. Webb (57) ABSTRACT

An approach that provides assigning and tracking inter-Cloud operational transactions within a Cloud computing environment in order to meter Cloud resource usage when processing a Cloud service request. In one embodiment, there is a Cloud usage and accounting tool, including a route management component configured to define and manage the physical implementation of delineation points between Clouds. The Cloud usage and accounting tool further includes a workflow control component configured to track inter-Cloud operational transactions as they pass through the delineation points.

22 Claims, 9 Drawing Sheets

(56) References Cited

U.S. PATENT DOCUMENTS

2011/0078303 A1* 3/2011 Li et al. .................... 709/224
2011/0113467 A1* 5/2011 Agarwal et al. ............... 726/1
2011/0131499 A1* 6/2011 Ferris et al. ................ 715/736

OTHER PUBLICATIONS

Maitland, J. "Keeping Control Isnt' Easy", Cloud Computing, Searchcloudcomputing.com, Chapter 4: Cloud-Based Infrastructure, Oct. 2009, 13 pages.

* cited by examiner

METERING RESOURCE USAGE IN A CLOUD COMPUTING ENVIRONMENT

FIELD OF THE INVENTION

This application is related in some aspects to pending application number to be provided having the title "CREDIT MANAGEMENT FOR RESOURCE SHARING WITHIN A CLOUD COMPUTING ENVIRONMENT", filed on (to be provided), U.S. patent application Ser. No. 12/636,664, the entire contents of which are herein incorporated by reference.

BACKGROUND OF THE INVENTION

Cloud computing is a computing technology that uses the Internet and central remote servers to maintain data and applications. A Cloud provider may employ multiple Clouds when providing a set of services to a customer. There are scenarios where it is necessary for multiple Clouds to inter-operate to provide an overall composite service to a customer. In these instances, it is imperative that a Cloud provider knows exactly what units of work are within its Cloud (and therefore responsibility), what units have been transferred to other Clouds (and when), and what units were transferred into its Cloud (and when).

Currently, prior art Cloud computing environments provide no known solution for tracking the exchange of information between distinct computing Clouds. As is known in the art, this type of inter-Cloud activity may be necessary when providing a service for the customer. In order to bill the customer accurately, the Cloud provider is required to accurately track and manage usage for inter-Cloud services.

SUMMARY OF THE INVENTION

This disclosure describes a system and method for assigning and tracking inter-Cloud operational transactions in order to meter Cloud usage in a Cloud computing environment when processing a Cloud service request. Using this system, the Cloud service provider will be able to accurately track and manage usage for inter-Cloud services when employing multiple clouds in processing a Cloud service request.

A first aspect of the present invention provides a method for metering resource usage in a Cloud computing environment, comprising: defining the physical implementation of delineation points on each of the plurality of Clouds in the environment; tracking each of a plurality of inter-Cloud operational transactions as each transaction passes through a delineation point entering a Cloud; tracking each of the plurality of inter-Cloud operational transactions as each transaction passes through a delineation point exiting a Cloud; maintaining a transaction ledger in each of the plurality of Clouds; calculating an amount of time each of the plurality of operational transactions was within each of the plurality of Clouds; and storing the amount of time in the respective transaction ledger.

A second aspect of the present invention provides a Cloud usage and accounting tool for metering resource usage within a Cloud computing, comprising: a memory medium comprising instructions; a bus coupled to the memory medium; and a processor coupled to the bus that when executing the instructions causes the Cloud usage and accounting tool to: define the physical implementation of delineation points on a Cloud in the environment; track each of a plurality of inter-Cloud operational transactions as each transaction passes through a delineation point entering the Cloud; track each of the plurality of inter-Cloud operational transactions as each transaction passes through a delineation point exiting the Cloud; maintain a transaction ledger; calculate amount of time each of the plurality of operational transactions was within the Clouds; and store the amount of time in the transaction ledger.

A third aspect of the present invention provides a computer-readable medium storing computer instructions which, when executed, enables a computer system to provide metering resource usage within a Cloud computing environment, the computer readable medium comprising program code for causing a computer system to: define the physical implementation of delineation points on a Cloud in the environment; track each of a plurality of inter-Cloud operational transactions as each transaction passes through a delineation point entering the Cloud; track each of the plurality of inter-Cloud operational transactions as each transaction passes through a delineation point exiting the Cloud; maintain a transaction ledger; calculate amount of time each of the plurality of operational transactions was within the Clouds; and store the amount of time in the transaction ledger.

A fourth aspect of the present invention provides a method for deploying a system for metering resource usage in a Cloud computing environment, comprising: defining the physical implementation of delineation points on a Cloud in the environment; tracking each of a plurality of inter-Cloud operational transactions as each transaction passes through a delineation point entering the Cloud; tracking each of the plurality of inter-Cloud operational transactions as each transaction passes through a delineation point exiting the Cloud; maintain a transaction ledger; calculating an amount of time each of the plurality of operational transactions was within the Clouds; and storing the amount of time in the transaction ledger.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience, the Detailed Description of the Invention has the following sections:
I. Cloud Computing Definitions
II. Implementation of the Present Invention I. Cloud Computing Definitions These definitions have been derived from the "Draft NIST Working Definition of Cloud Computing" by Peter Mell and Tim Grance, dated Oct. 7, 2009, which is cited on an IDS filed herewith, and a copy of which is attached thereto.

"Cloud computing" is a model for enabling convenient, on-demand network access to a shared pool of configurable computing resources (e.g., networks, servers, storage, applications, and services) that can be rapidly provisioned and released with minimal management effort or service provider interaction. This Cloud model promotes availability and is comprised of at least five characteristics, three service models, and four deployment models. Characteristics are as follows:

On-demand self-service: A consumer can unilaterally provision computing capabilities, such as server time and network storage, as needed automatically without requiring human interaction with each service's provider.

Broad network access: Capabilities are available over the network and accessed through standard mechanisms that promote use by heterogeneous thin or thick client platforms (e.g., mobile phones, laptops, and PDAs).

Resource pooling: The provider's computing resources are pooled to serve multiple consumers using a multi-tenant model, with different physical and virtual resources dynamically assigned and reassigned according to consumer demand. There is a sense of location independence in that the customer generally has no control or knowledge over the exact location of the provided resources but may be able to specify location at a higher level of abstraction (e.g., country, state, or datacenter). Examples of resources include storage, processing, memory, network bandwidth, and virtual machines.

Rapid elasticity: Capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured Service: Cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Cloud Software as a Service (SaaS): The capability provided to the consumer is to use the provider's applications running on a Cloud infrastructure. The applications are accessible from various client devices through a thin client interface such as a web browser (e.g., web-based email). The consumer does not manage or control the underlying Cloud infrastructure including network, servers, operating systems, storage, or even individual application capabilities, with the possible exception of limited user-specific application configuration settings.

Cloud Platform as a Service (PaaS): The capability provided to the consumer is to deploy onto the Cloud infrastructure consumer-created or acquired applications created using programming languages and tools supported by the provider. The consumer does not manage or control the underlying Cloud infrastructure including network, servers, operating systems, or storage, but has control over the deployed applications and possibly application hosting environment configurations.

Cloud Infrastructure as a Service (IaaS): The capability provided to the consumer is to provision processing, storage, networks, and other fundamental computing resources where the consumer is able to deploy and run arbitrary software, which can include operating systems and applications. The consumer does not manage or control the underlying Cloud infrastructure but has control over operating systems, storage, deployed applications, and possibly limited control of select networking components (e.g., host firewalls).

Deployment Models are as follows:

Private Cloud: The Cloud infrastructure is operated solely for an organization. It may be managed by the organization or a third party and may exist on premise or off premise.

Community Cloud: The Cloud infrastructure is shared by several organizations and supports a specific community that has shared concerns (e.g., mission, security requirements, policy, and compliance considerations). It may be managed by the organizations or a third party and may exist on premise or off premise.

Public Cloud: The Cloud infrastructure is made available to the general public or a large industry group and is owned by an organization selling Cloud services.

Hybrid Cloud: The Cloud infrastructure is a composition of two or more Clouds (private, community, or public) that remain unique entities but are bound together by standardized or proprietary technology that enables data and application portability (e.g., Cloud bursting for load-balancing between Clouds).

Cloud software takes full advantage of the Cloud paradigm by being service oriented with a focus on statelessness, low coupling, modularity, and semantic interoperability.

II. Implementation of the Present Invention

Embodiments of this invention are directed to assigning and tracking inter-Cloud operational transactions within a Cloud computing environment, such that the Cloud provider can accurately track and manage usage for cross-Cloud services. In these embodiments, a Cloud usage and accounting tool provides the capability to meter Cloud usage within a Cloud computing environment when processing a Cloud service request.

Specifically, the Cloud usage and accounting tool defines and manages the physical implementation of delineation points (DP's) at the infrastructure level along available routes between computing Clouds. At the packet level, operational transactions pass these points as data makes its way into a Cloud to be processed. Use of delineation points at the infrastructure level allows for tracking transactions as they pass through the interface points. This information is then used as input to any processes that need to know exactly how long a unit of work was in the Cloud, such as metering and billing applications.

Figure 1:
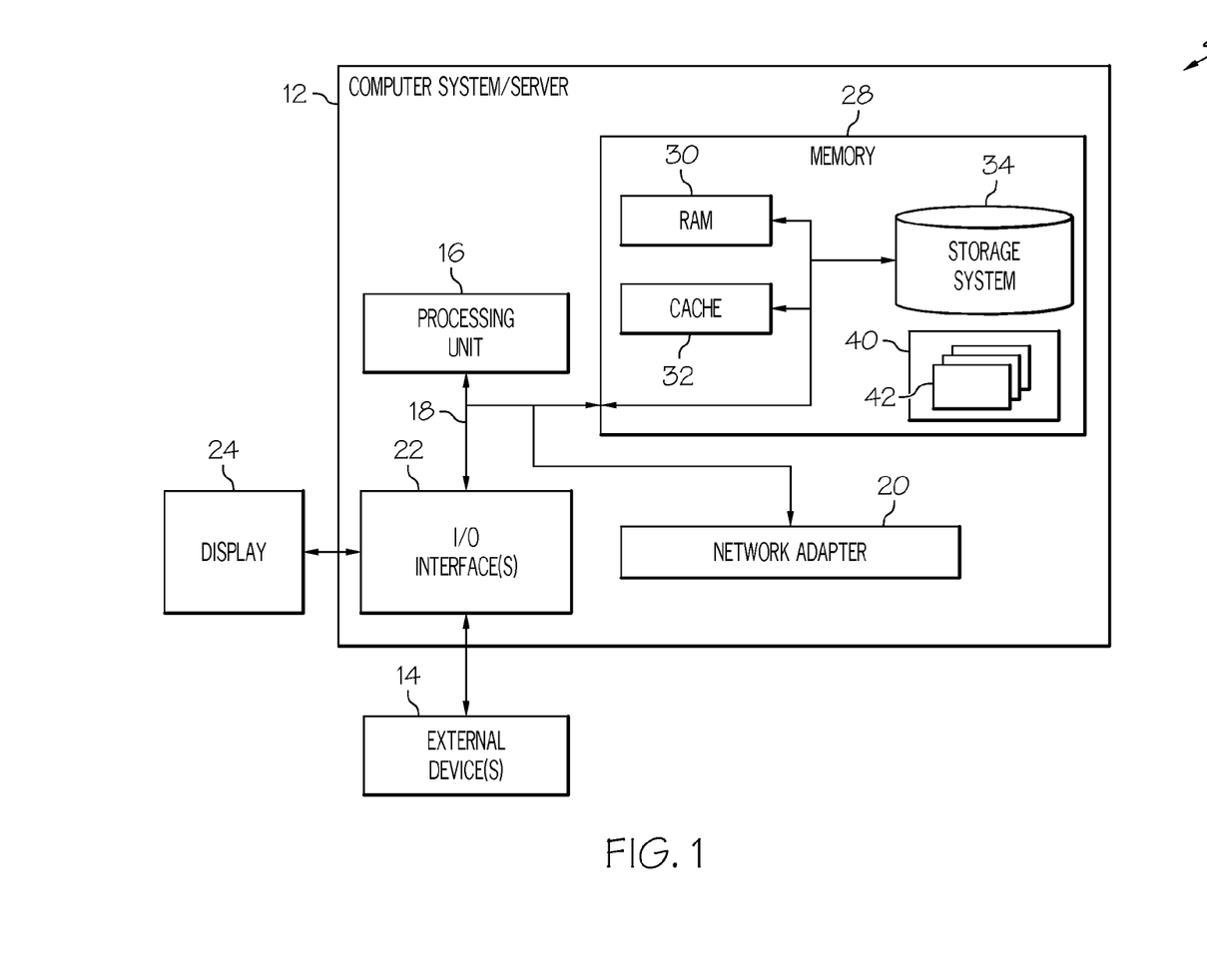
FIG. 1 shows a Cloud system node according to the present invention.

Referring now to FIG. 1, a schematic of an exemplary cloud computing node is shown. Cloud computing node 10 is only one example of a suitable cloud computing node and is not intended to suggest any limitation as to the scope of use or functionality of the invention described herein. Regardless, cloud computing node 10 is capable of being implemented and/or performing any of the functions set forth in section I above.

In Cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed Cloud computing environments that include any of the above systems or devices, and the like.

Computer system/server 12 may be described in the general context of computer system-executable instructions, such as program modules, being executed by a computer system. Generally, program modules include routines, programs, objects, components, logic, data structures, and so on that perform particular tasks or implement particular abstract data types. The exemplary computer system/server 12 may be practiced in distributed Cloud computing environments where tasks are performed by remote processing devices that are linked through a communications network. In a distributed Cloud computing environment, program modules may be located in both local and remote computer system storage media including memory storage devices.

As shown in FIG. 1, computer system/server 12 in Cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, a storage system 34 can be provided for reading from and writing to a non-removable, non-volatile magnetic media (not shown and typically called a "hard drive"). Although not shown a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of the invention.

Program/utility 40 having a set (at least one) of program modules 42 may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
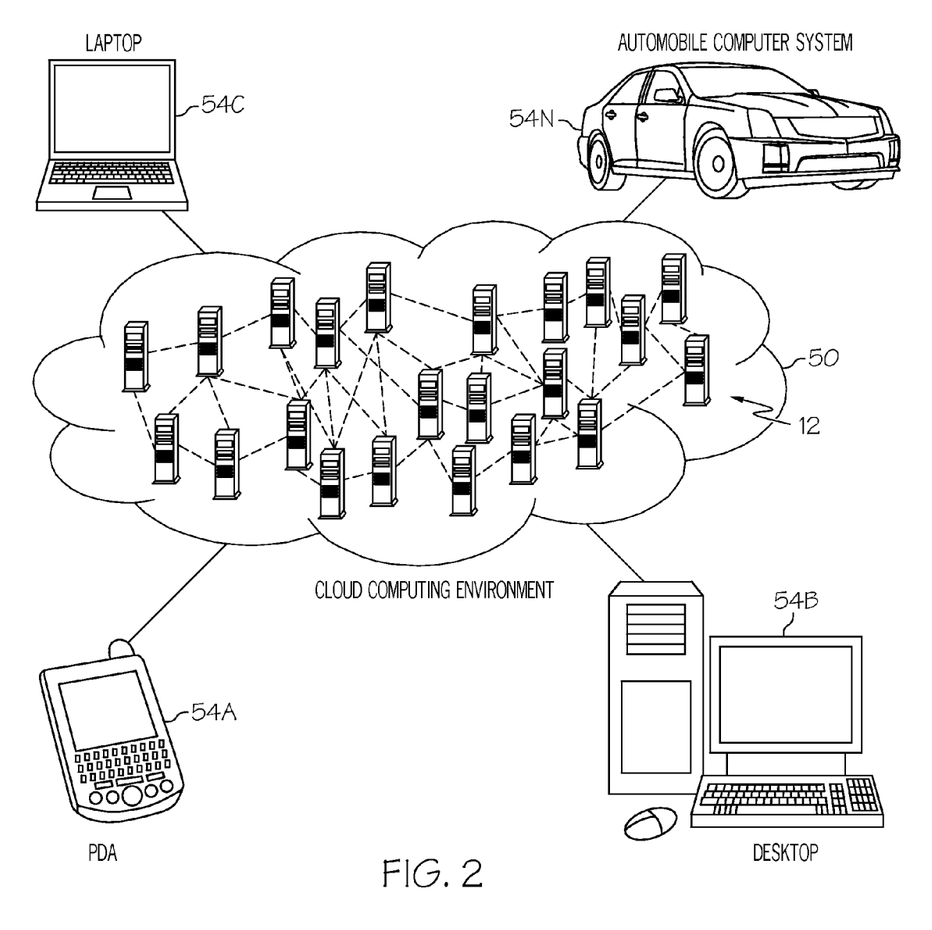
FIG. 2 shows a Cloud computing environment according to the present invention.

Referring now to FIG. 2, illustrative Cloud computing environment 50 is depicted. As shown, Cloud computing environment 50 comprises one or more Cloud computing nodes 10 with which computing devices such as, for example, personal digital assistant (PDA) or cellular telephone 54A, desktop computer 54B, laptop computer 54C, and/or automobile computer system 54N communicate. This allows for infrastructure, platforms and/or software to be offered as services (as described above in Section I) from Cloud computing environment 50 so as to not require each client to separately maintain such resources. It is understood that the types of computing devices 54A-N shown in FIG. 2 are intended to be illustrative only and that Cloud computing environment 50 can communicate with any type of computerized device over any type of network and/or network/addressable connection (e.g., using a web browser).

Figure 3:
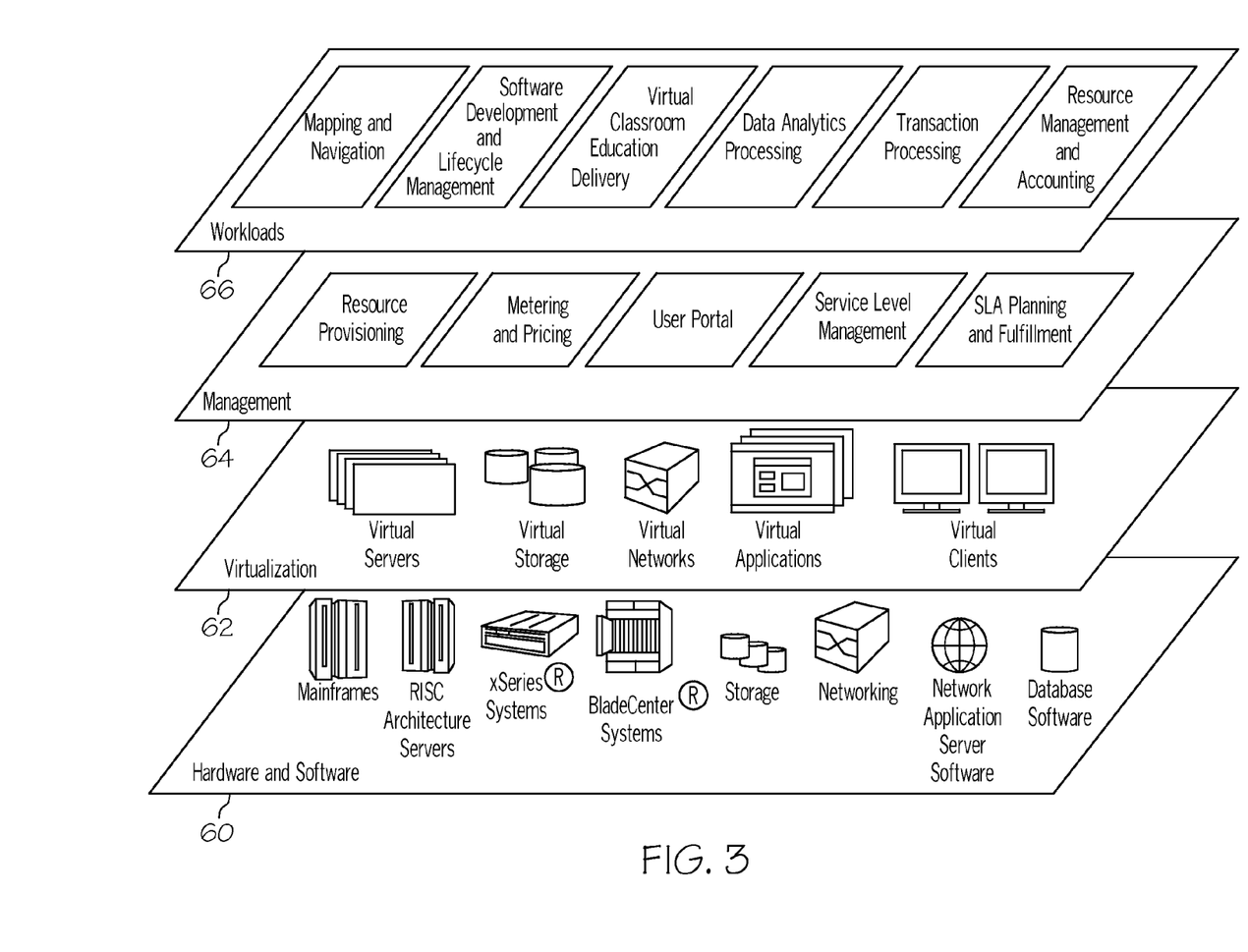
FIG. 3 shows Cloud abstraction model layers according to the present invention.

Referring now to FIG. 3, a set of functional abstraction layers provided by Cloud computing environment 50 (FIG. 2) is shown. It should be understood in advance that the components, layers, and functions shown in FIG. 3 are intended to be illustrative only and the invention is not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation in the United States, other countries, or both.)

Virtualization layer 62 provides an abstraction layer from which the following exemplary virtual entities may be provided: virtual servers; virtual storage; virtual networks, including virtual private networks; virtual applications; and virtual clients.

Management layer 64 provides the exemplary functions described below. Resource provisioning provides dynamic procurement of computing resources and other resources that are utilized to perform tasks within the Cloud computing environment. Metering and Pricing provide cost tracking as resources are utilized within the Cloud computing environment, and billing or invoicing for consumption of these resources. In one example, these resources may comprise application software licenses. Security provides identity verification for users and tasks, as well as protection for data and other resources. User portal provides access to the Cloud computing environment for both users and system administrators. Service level management provides Cloud computing resource allocation and management such that required service levels are met. Service Level Agreement (SLA) planning and fulfillment provides pre-arrangement for, and procurement of, Cloud computing resources for which a future requirement is anticipated in accordance with an SLA.

Workloads layer 66 provides functionality for which the Cloud computing environment is utilized. Examples of workloads and functions which may be provided from this layer include: mapping and navigation; software development and lifecycle management; virtual classroom education delivery; data analytics processing; transaction processing; and Cloud usage and accounting.

Figure 4:
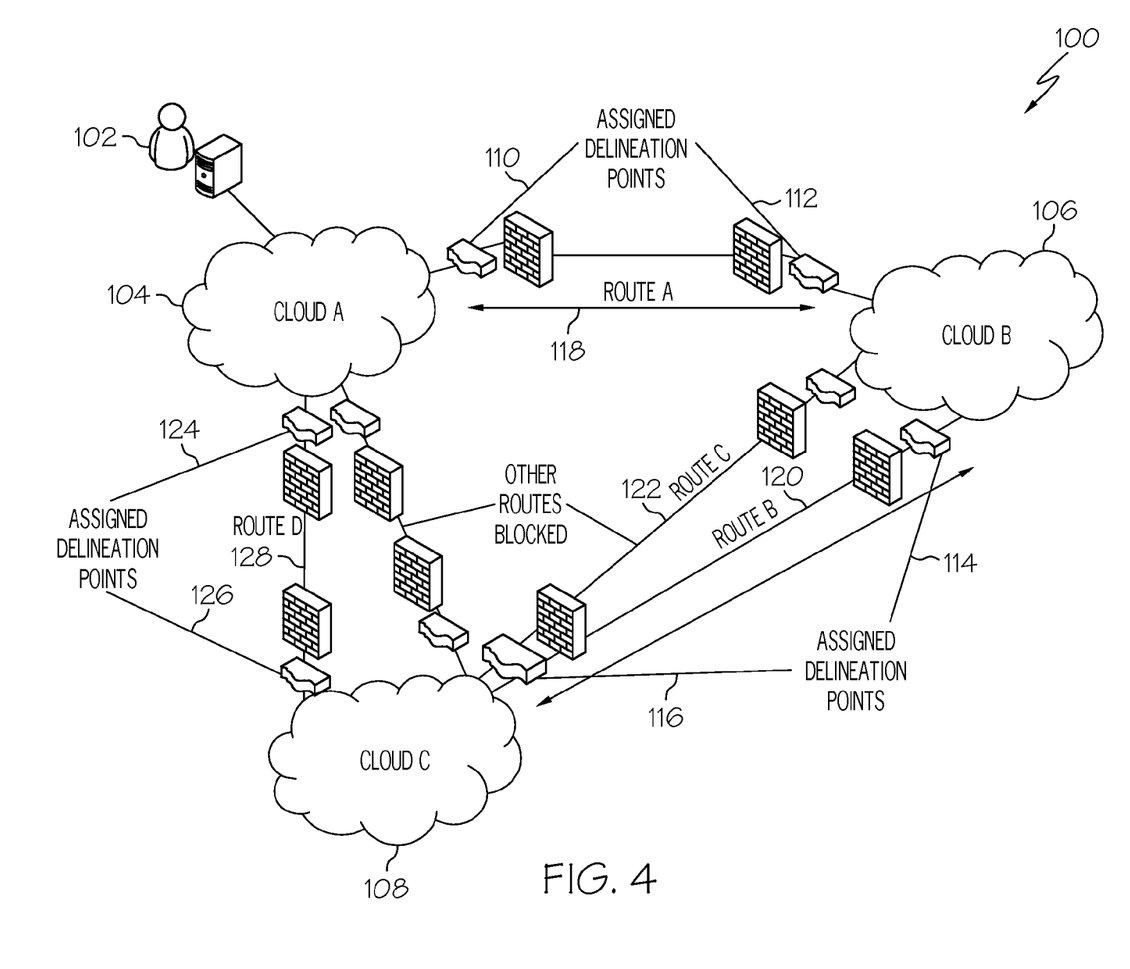
FIG. 4 shows an illustrative example of a Cloud computing environment according to one embodiment of this invention.

FIG. 4 shows a detailed view of an exemplary Cloud computing node 10 according to one embodiment of this invention in which inter-Cloud transactions are assigned and tracked. A customer has a relationship with a Cloud provider. When a customer makes a service request to the Cloud provider, the Cloud provider may need to utilize multiple Clouds when providing the service to the customer. The customer only recognizes and expects to deal with the primary provider, but in the background other Clouds are utilized. The Cloud provider is required to accurately track and manage customer's usage for the cross-Cloud services. When managing a service that spans multiple Clouds, close attention to which Clouds are running what (and at what time) need to be understood.

An exemplary Cloud computing environment 100 is shown in FIG. 4. In this environment, each Cloud is a system unto itself. The infrastructure discussed below applies to each Cloud in the environment. Prior to receiving any service requests, logical interface points on each Cloud's physical network infrastructure are identified as allowable points of entry/exit for the Cloud to accurately track the inter-Cloud transactions required when fulfilling a service request. These entry/exit, or delineation, points may be in the form of a 'network' type barrier, such as a firewall or other logging computer that manages the points.

After the infrastructure is in place for each Cloud, customer makes a service request from Cloud A 104. From the customer's point of view, the completed service comes from only Cloud A 104. In reality, Cloud A 104 determines it needs services from Cloud B 106 in order to accommodate customer's request. Additionally, while in Cloud B 106, Cloud B 106 determines it needs to interact with Cloud C 108. Utilizing the delineation points defined for each Cloud, the processing flow is controlled and tracked, as discussed in more detail below.

FIG. 4 depicts Clouds, delineation points, and routes between Clouds in an exemplary Cloud computing environment. The number of Clouds, delineation points, and routes shown in FIG. 4 are only for illustration purposes and those skilled in the art will recognize that there may be more or fewer Clouds, delineation points, and/or routes defined in a typical Cloud computing environment.

Figure 5:
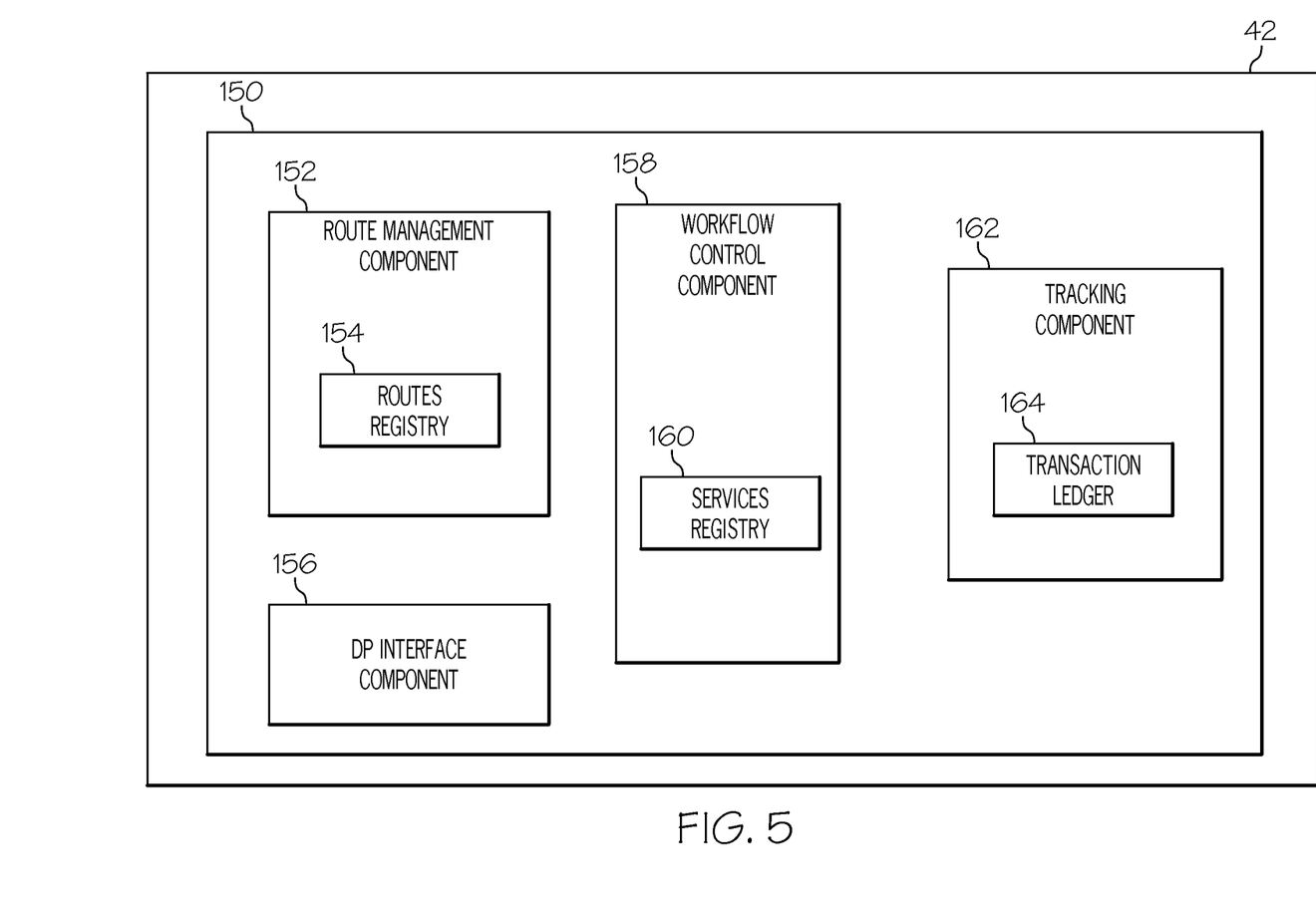
FIG. 5 shows an illustrative example of a Cloud usage and accounting tool according to one embodiment of this invention.

FIG. 5 shows a more detailed view of usage and accounting mechanism of Workloads layer 66 shown in FIG. 3 needed to control and track the processing flow. Cloud usage and accounting tool 150 comprises a route management component 152 configured to manage routing of traffic into and out of the Cloud in order to accurately account for processing flows. To accomplish this, route management component 152 defines and manages the allowable delineation points of the Cloud. Once the delineation points are assigned, route management component 152 is further configured to block all other available routes to ensure that all traffic passes through a delineation point as it enters and exits the Cloud.

Information relating to location of delineation points, as well as available and blocked routes is stored in routes registry 154. Given the dynamic nature of Cloud infrastructures, it is possible that the physical or logical components that support a DP can change autonomically. Therefore, route management component 152 is further configured to monitor the state of each DP to ensure the accuracy of routes registry 154.

Referring back to FIG. 4, DP 110 is defined for Cloud A 104. DP's 112, 114 are defined for Cloud B 106. DP 116 is defined for Cloud C 108. Route A 118 is the only route between Cloud A 104 and Cloud B 106. Route B 120 is the available route between the Cloud B 106 and Cloud C 108. Route C 122 is blocked. Data relating to a Cloud's delineation points and routes is stored in the Cloud's routes registry 154.

Customer 102 initiates a service request from Cloud A 104. Cloud A determines that there is a need to utilize the services of Cloud B 106 and a network transfer of a work unit (WU), or operational transaction, along route A 118 is utilized. As used herein, a WU is defined as the routing data and other data necessary for the target Cloud to perform the needed service(s). Additionally, WU is tagged with customer number, service request number and work unit number. Units of work are transferred in one or more data packets along network routes.

Cloud usage and accounting tool 150 further comprises DP interface component 156 configured to allow a delineation point to receive WU packets. DP interface component 156 of Cloud B 106 is configured to perform a handshake to receive the WU packets from Cloud A 104. In one embodiment, DP interface component 156 is further configured to acknowledge receipt of WU packets to sending Cloud. DP interface component 156 of Cloud B 106 updates the routing data of the WU packets with the time WU packets were received by Cloud B 106.

Workflow control component 158 is a control mechanism configured to 'handover' control between DP's and their associated Clouds. Also, workflow control component 158 controls the processing workflow. In one embodiment, the delineation point operates 'internally' with each workflow control component 158 communicating and detailing the Cloud services that are provided. Based on the resources needed, workflow control component 158 reads services registry 160 to determine where to route the workflow. In this embodiment, services registry 160 must be maintained on each Cloud. Services registry 160 contains information relating to the availability and resource data of each Cloud residing in the Cloud computing environment.

In another embodiment, the originating Cloud controls workflow using expanded token passing algorithms. In this embodiment, once a Cloud has completes or exhausts its own Cloud resource, the token passes (i.e., control) to the next Cloud. Each token contains routing information and details of which Clouds have been used to provide the service. Using the token passing method, work unit packets are passed along with the token. Two different token passing algorithms can be used, as discussed below.

Figure 6:
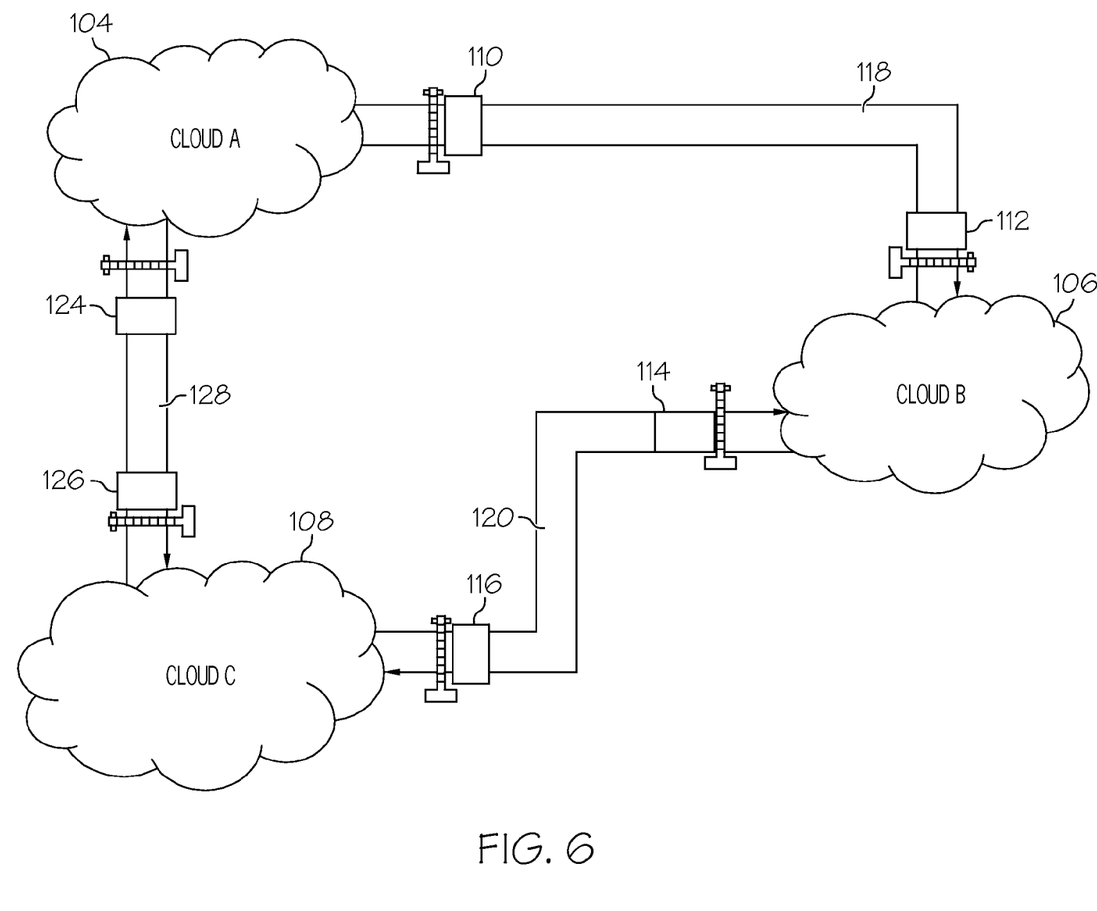
FIG. 6 shows an illustrative example of the bus control method.

In FIG. 6, the token is passed between Clouds using a bus control method. As each Cloud passes the token, the receiving Cloud takes control and completes the necessary work then hands over control to the next Cloud, and so on until the service request is completed. In the example of FIG. 6, Cloud A 104 determines it needs services from Cloud B 106 and Cloud C 108. Using the bus control method, DP 110 of Cloud A passes control to DP 112 of Cloud B 106 through change in token. DP 112 assumes control and acknowledges receipt of token to DP 110. Cloud B 106 completes required work. DP 114 of Cloud B 106 passes control to DP 116 of Cloud C 108 through change in token. DP 108 assumes control and acknowledges receipt of token to DP 114. Cloud C 108 completes required work. DP 126 of Cloud C 108 passes control to DP 124 of Cloud A 104 through change in token. Route D 128 is a blocked route. DP 124 assumes control and acknowledges receipt of token to DP 126. Cloud A 104 completes required work thereby fulfilling customer's service request.

Figure 7:
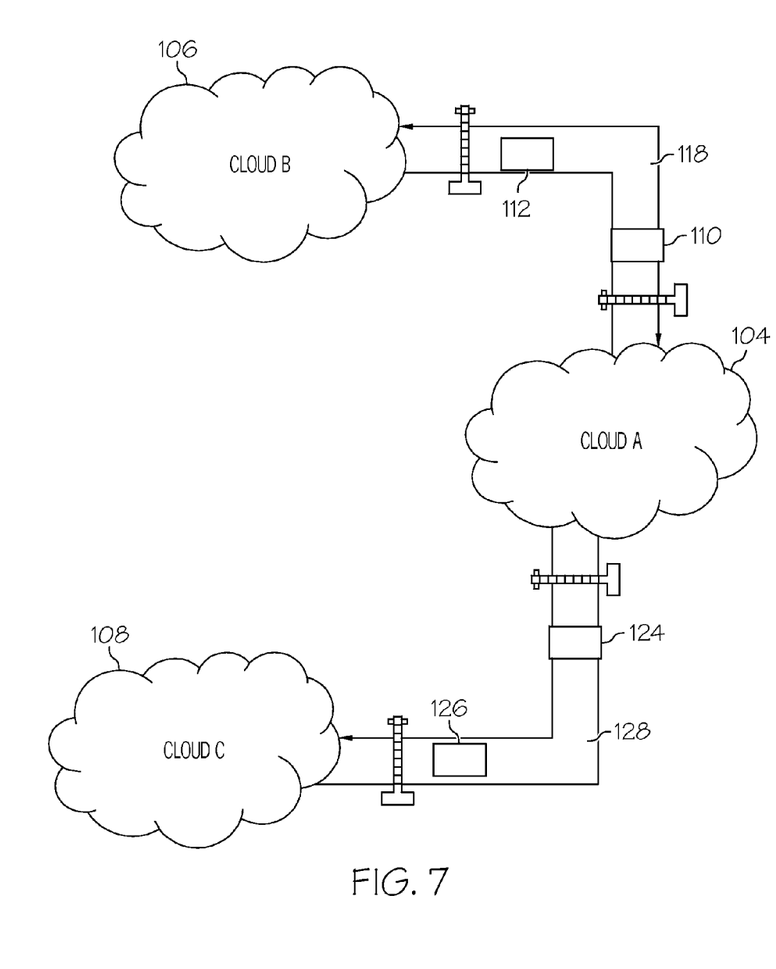
FIG. 7 shows an illustrative example of the hub/spoke control method.

In FIG. 7, tokens are passed between Clouds using a hub/spoke method with the originating Cloud acting as the hub. As each Cloud passes the token, the receiving Cloud (spoke) takes control and completes the necessary work then hands over control back to the originating Cloud (hub). This continues until the service request is completed. In the example of FIG. 7, Cloud A 104 determines it needs services from Cloud B 106 and Cloud C 108. Using the hub/spoke control method, DP 110 of Cloud A passes control to DP 112 of Cloud B 106 through change in token. Cloud B 106 completes required work. DP 112 of Cloud B 106 passes control back to DP 110 of Cloud A 104 through change in token. DP 124 of Cloud A passes control to DP 126 of Cloud C 108 through change in token. Cloud C completes required work. DP 126 of Cloud C passes control back to DP 124 of Cloud A 104. Cloud A 104 completes required work thereby fulfilling customer's service request.

In each method, each token consists of more than ownership details. The token may also contain 'higher level' control details such as service level response time. Typical token passing algorithms could be used using typical transport or session layer attributes to control the environment.

Once the work unit packets are in the Cloud, the Cloud is able to complete the needed services or determine it requires resources from another Cloud. After completing this work, workflow control component 158 then controls the handover from the Cloud to the DP. DP interface point receives the work unit packets, updates the routing data in the packets, and transfers the packets along an available route.

As WU packets exit the Cloud, tracking component 162 is configured to update Cloud transaction ledger 164. Transaction component captures the accounting for work unit flows by reading data from work unit packets. Transaction ledger 164 includes Cloud consumer, Cloud provider, service request number, work unit number, work unit usage (time spent in the Cloud), and status information (open, complete or error). An example is shown below.

Transaction Ledger 164:

| Cloud Customer | Cloud Provider | Service Request # | Work Unit # | Work Unit Usage | Status |
|---|---|---|---|---|---|
| Consumer | ACME | 133 | 223 | 53 | Complete |

Figure 8:
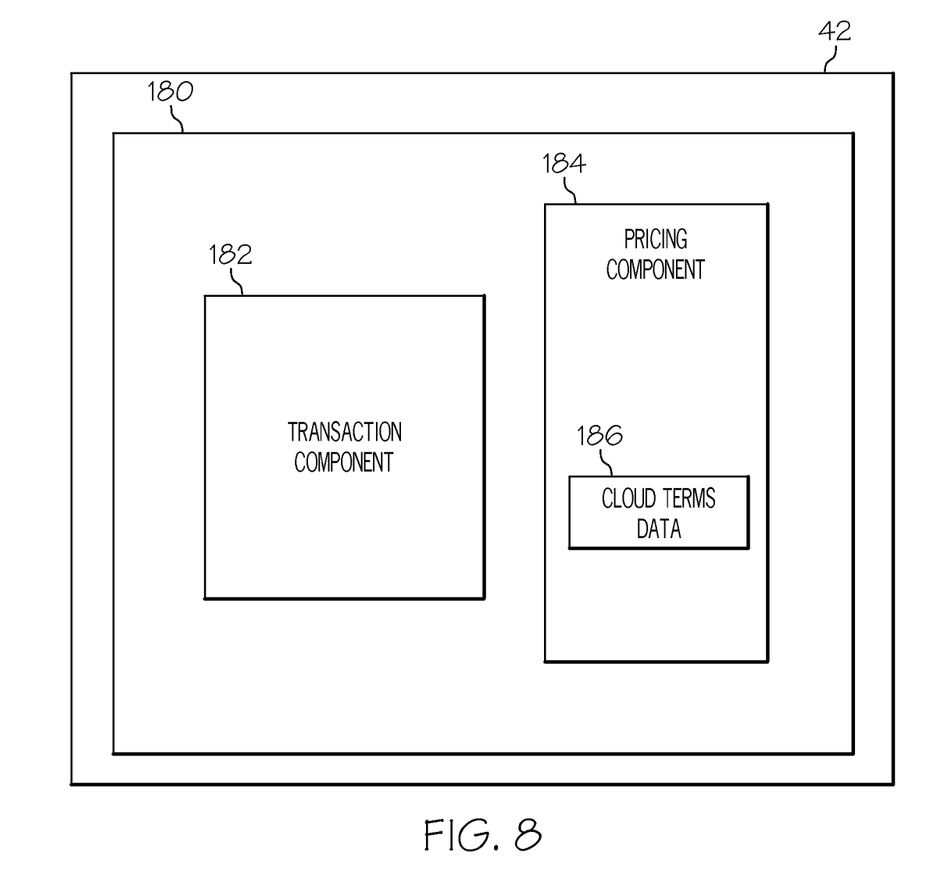
FIG. 8 shows an illustrative example of a billing tool according to one embodiment of this invention.

In another embodiment of this invention, billing tool 180 is used as to calculate fees when providing services to customers. Billing tool 180 resides either on one of the Clouds in the Cloud computing environment, typically the originating Cloud, or outside of the Clouds in the environment. As shown in FIG. 8, billing tool 180 includes transaction component 182 configured to read data from each transaction ledger 164 in the Cloud computing environment. Billing tool 180 also includes terms component 184 configured to read Cloud terms data 186 for each Cloud in the Cloud computing environment. Billing tool 180 uses data from each transaction ledger 164 and terms data for each Cloud to calculate customer fees.

In this embodiment, the Cloud provider or a third party service provider could offer this charging service by performing the functionalities described herein on a subscription and/or fee basis. In this case, the Cloud provider or the third party service provider can create, deploy, maintain, support, etc., transaction tool that performs the processes described below. In return, the Cloud provider or the third party service provider can receive payment from the Cloud customers requesting services.

Figure 9:
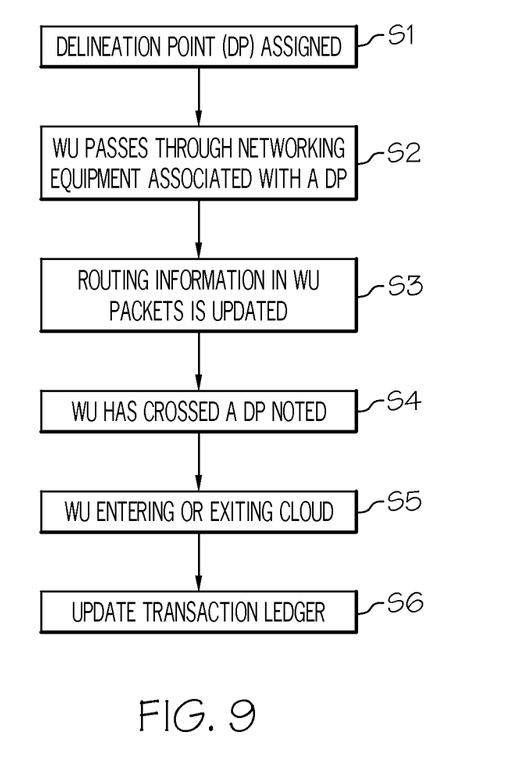
FIG. 9 shows a flow diagram of a method according to the present invention.

FIG. 9 depicts the methodologies disclosed herein. According to one embodiment, in step S1, Cloud usage and accounting tool 150 assigns allowable entry/exit points for the Cloud. In S2, a work unit passes through networking equipment associated with a DP. In S3, routing information in WU packets is updated. In S4, routing data is read and it is noted that WU has crossed a DP. In S5, WU leaves the DP and either enters or exits the Cloud. In S6, when the WU exits the Cloud, the transaction ledger 164 is updated with information ascertained from tracking the WU.

The flowchart of FIG. 9 illustrates the architecture, functionality, and operation of possible implementations of systems, methods and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

While shown and described herein as a solution for metering Cloud usage within a Cloud computing environment when processing a Cloud service request, it is understood that the invention further provides various alternative embodiments. For example, in one embodiment, the invention provides a computer-readable/useable medium that includes computer program code to enable a computer infrastructure to provide metering Cloud usage functionality as discussed herein. To this extent, the computer-readable/useable medium includes program code that implements each of the various processes of the invention. It is understood that the terms computer-readable medium or computer-useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a method that performs the process of the invention on a subscription, advertising, and/or fee basis. That is, a service provider, such as a Solution Integrator, could offer to provide query protection and/or masking functionality. In this case, the service provider can create, maintain, support, etc., a computer infrastructure, such as computer system 102 (FIG. 1) that performs the process of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for providing metering Cloud usage within a Cloud computing environment when processing a Cloud service request functionality. In this case, a computer infrastructure, such as computer system 102 (FIG. 1), can be provided and one or more systems for performing the process of the invention can be obtained (e.g., created, purchased, used, modified, etc.) and deployed to the computer infrastructure. To this extent, the deployment of a system can comprise one or more of: (1) installing program code on a computing device, such as computer system 102 (FIG. 1), from a computer-readable medium; (2) adding one or more computing devices to the computer infrastructure; and (3) incorporating and/or modifying one or more existing systems of the computer infrastructure to enable the computer infrastructure to perform the process of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic device system/ driver for a particular computing device, and the like.

A data processing system suitable for storing and/or executing program code can be provided hereunder and can include at least one processor communicatively coupled, directly or indirectly, to memory element(s) through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output or device devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A method for metering usage of a plurality of cloud resources in a cloud computing environment when processing a cloud service request, comprising:
   defining the physical implementation of delineation points on each cloud of a plurality of clouds in the environment, each of the delineation points comprising a network-type barrier that forms an entry point on a communication path to an associated one of the plurality of clouds for communications from another of the plurality of clouds;
   assigning each of a plurality of inter-cloud operational transactions to a set of delineation points for entry to and exit from a cloud, wherein the each of the plurality of inter-cloud operational transactions is a transaction that utilizes cloud services of an originating cloud and is transferred by the originating cloud to a receiving cloud, and wherein every operational transaction that is transferred from the originating cloud to the receiving cloud passes through a delineation point associated with the originating cloud and through a delineation point associated with the receiving cloud;
   tracking, by a delineation point for entry, each of a plurality of inter-cloud operational transactions as each transaction passes through the delineation point for entry entering a cloud;
   tracking, by a delineation point for exit, each of the plurality of inter-cloud operational transactions as each transaction passes through the delineation point for exit exiting a cloud;
   maintaining a transaction ledger in each of the plurality of clouds;
   calculating an amount of time each of the plurality of operational transactions was within each of the plurality of clouds; and
   storing the amount of time in the respective transaction ledger.

2. The method according to claim 1 further comprising:
   accessing a routes registry in each of the plurality of clouds, the routes registry containing information on the state of each delineation point of the respective cloud; and
   monitoring the state of each delineation point of each of the plurality of clouds; updating the respective routes registry when the state of at least one delineation point changes.

3. The method according to claim 2 further comprising:
   blocking routes into each of the plurality of clouds not having at least one delineation point; and
   storing blocked routes data in the respective routes registry.

4. The method according to claim 1 further comprising accessing a services registry in each of the plurality of clouds, the services registry containing availability and resources of each of the plurality of clouds.

5. The method according to method according to claim 4 further comprising:
   accessing availability and resources data from the services registry;
   accessing routing data from a routes registry; and
   routing the operational transaction along an available route based on at least one of the availability and resources data or the routing data.

6. The method according to claim 5 further maintaining a cloud terms registry, the cloud terms registry containing usage rates for each of the plurality of clouds.

7. The method according to claim 6 further comprising:
accessing cloud usage fee rates from the cloud terms registry;
accessing the amount of time within each cloud from the transaction ledger of each of the plurality of clouds for all transactions associated with a service request; and
calculating a cloud usage fee for processing the service request using data.

8. A Cloud usage and accounting tool for metering cloud resource usage in a Cloud computing environment, comprising:
a memory medium comprising instructions;
a bus coupled to the memory medium; and
a central processing unit coupled to the bus that when executing the instructions causes the Cloud usage and accounting tool to:
define the physical implementation of delineation points on each cloud of a plurality of clouds in the environment, each of the delineation points comprising a network-type barrier that forms an entry point on a communication path to an associated one of the plurality of clouds for communications from another of the plurality of clouds; and wherein every operational transaction that is transferred from the originating cloud to the receiving cloud passes through a delineation point associated with the originating cloud and through a delineation point associated with the receiving cloud;
assign each of a plurality of inter-cloud operational transactions to a set of delineation points for entry to and exit from a cloud, wherein the each of the plurality of inter-cloud operational transactions is a transaction that utilizes cloud services of an originating cloud and is transferred by the originating cloud to a receiving cloud;
track, by a delineation point for entry, each of a plurality of inter-cloud operational transactions as each transaction passes through the delineation point for entry entering the cloud;
track, by a delineation point for exit, each of a plurality of inter-cloud operational transactions as each transaction passes through the delineation point for exit exiting the cloud;
maintain a transaction ledger in the cloud;
calculate amount of time each of the plurality of operational transactions was within the cloud; and
store the amount of time in the transaction ledger.

9. The Cloud usage and accounting tool according to claim 8 being further caused to maintain a routes registry in the cloud, the routes registry containing information on the state of each delineation point of the cloud; and
monitor the state of each delineation point of the cloud; updating the routes registry when the state of at least one delineation point changes.

10. The Cloud usage and accounting tool according to claim 9 being further caused to block routes into the cloud not containing at least one delineation point; and store information relating to blocked routes in the routes registry.

11. The cloud usage and accounting tool according to claim 8 being further caused to access a services registry, the services registry containing availability and resources of each of the plurality of clouds.

12. The cloud usage and accounting tool according to claim 11 being further caused to access availability and resources data from the services registry; access routing data from a routes registry; and route operational transaction along an available route based on at least one of the availability and resources data or the routing data.

13. The cloud usage and accounting tool according to claim 12 being further caused to access a cloud terms registry, the cloud terms registry containing usage rates for the cloud.

14. The cloud usage and accounting tool according to claim 13 being further caused to access cloud usage fee rates from the cloud terms registry; access the amount of time within the cloud from the transaction ledger of the cloud; and calculate a cloud usage fee based on the data.

15. A computer-readable storage device storing computer instructions, which when executed, enables a computer system to meter usage of a plurality of cloud resources in a cloud computing environment when processing a cloud service request, comprising:
define the physical implementation of delineation points on each cloud of a plurality of clouds in the environment, each of the delineation points comprising a network-type barrier that forms an entry point on a communication path to an associated one of the plurality of clouds for communications from another of the plurality of clouds, and wherein every operational transaction that is transferred from the originating cloud to the receiving cloud passes through a delineation point associated with the originating cloud and through a delineation point associated with the receiving cloud;
assign each of a plurality of inter-cloud operational transactions to a set of delineation points for entry to and exit from a cloud, wherein the each of the plurality of inter-cloud operational transactions is a transaction that utilizes cloud services of an originating cloud and is transferred by the originating cloud to a receiving cloud;
track, by a delineation point for entry, each of a plurality of inter-cloud operational transactions as each transaction passes through the delineation point for entry entering the cloud;
track, by a delineation point for exit, each of a plurality of inter-cloud operational transactions as each transaction passes through the delineation point for exit exiting the cloud;
maintain a transaction ledger in the cloud;
calculate amount of time each of the plurality of operational transactions was within the cloud; and
store the amount of time in the transaction ledger.

16. The computer readable storage device containing the program product of claim 15, the computer readable storage device further comprising program code for causing the computer system to maintain a routes registry, the routes registry containing information on the state of each delineation point of the cloud; and monitor the state of each delineation point of each of the plurality of clouds; updating the routes registry when the state of at least one delineation point changes.

17. The computer readable storage device containing the program product of claim 16, the computer readable storage device further comprising program code for causing the computer system to block routes into the cloud not containing at least one delineation point; and store information relating to blocked routes in the routes registry.

18. The computer readable storage device containing the program product of claim 15, the computer readable storage device further comprising program code for causing the computer system to maintain a services registry, the services registry containing information relating to the availability and resources of each of the plurality of clouds.

19. The computer readable storage device containing the program product of claim 18, the computer readable storage device further comprising program code for causing the computer system to access availability and resources data from the services registry; access routing data from a routes registry; and routing the operational transaction along an available route based on the based on at least one of the availability and resources data or the routing data data.

20. The computer readable storage device containing the program product of claim 19, the computer readable storage device further comprising program code for causing the computer system to maintain a cloud terms registry, the cloud terms registry containing usage rates for the cloud.

21. The computer readable storage device containing the program product of claim 20, the computer readable storage device further comprising program code for causing the computer system to access cloud usage rates from the cloud terms registry; access the amount of time within the cloud from the transaction ledger; and calculate a cloud usage fee based on the data.

22. A method for deploying a system for metering cloud resource usage in a Cloud computing environment, comprising:

providing a computer infrastructure being operable to:

define the physical implementation of delineation points on each cloud of a plurality of clouds in the environment, each of the delineation points comprising a network-type barrier that forms an entry point on a communication path to an associated one of the plurality of clouds for communications from another of the plurality of clouds;

assigning each of a plurality of inter-cloud operational transactions to a set of delineation points for entry to and exit from a cloud, wherein the each of the plurality of inter-cloud operational transactions is a transaction that utilizes cloud services of an originating cloud and is transferred by the originating cloud to a receiving cloud, and wherein every operational transaction that is transferred from the originating cloud to the receiving cloud passes through a delineation point associated with the originating cloud and through a delineation point associated with the receiving cloud;

track, by a delineation point for entry, each of a plurality of inter-cloud operational transactions as each transaction passes through the delineation point for entry entering the cloud;

track, by a delineation point for exit, each of the plurality of inter-cloud operational transactions as each transaction passes through the delineation point for exit exiting the cloud;

maintain a transaction ledger;

calculate amount of time each of the plurality of operational transactions was within the cloud; and     store the amount of time in the transaction ledger.

\* \* \* \* \*